United States Patent [19]
Yu

[11] Patent Number: 5,765,793
[45] Date of Patent: Jun. 16, 1998

[54] CLAMP-BASED STAND AND A PEDESTAL FOR HOLDING THE SAME

[76] Inventor: Alexander Yu, 10F-1, No. 1, Lane 550, Min-Sheng E. Rd., Taipei City, Taiwan

[21] Appl. No.: 705,332

[22] Filed: Aug. 29, 1996

[30] Foreign Application Priority Data

Jul. 6, 1996 [TW] Taiwan .................. 85210301

[51] Int. Cl.⁶ .................................................. A47G 29/00
[52] U.S. Cl. ...................... 248/126; 248/229.1; 362/396; 362/413
[58] Field of Search .................... 248/126, 160, 248/229.1, 104, 346.021, 506, 910, 231.81, 558, 694; 362/388, 396 R, 410, 413 R

[56] References Cited

U.S. PATENT DOCUMENTS

| | | | |
|---|---|---|---|
| 3,573,401 | 4/1971 | Lininger | 179/147 |
| 3,689,687 | 9/1972 | Bosch | 248/316.7 |
| 4,214,688 | 7/1980 | Griffin, Jr. | 362/396 |
| 4,219,176 | 8/1980 | Weiss | 248/910 |
| 4,678,153 | 7/1987 | Maddock et al. | 248/316.7 |
| 4,850,804 | 7/1989 | Huang | 248/278.1 |
| 5,033,528 | 7/1991 | Volcani | 248/126 |

*Primary Examiner*—Ramon O. Ramirez
*Assistant Examiner*—Anita M. King
*Attorney, Agent, or Firm*—Christensen O'Connor Johnson & Kindness PLLC

[57] ABSTRACT

A stand device for an article such as a lamp or a fan includes a holding post which has at its lower end a clamp base for mounting the holding post, and a pedestal for receiving and holding the clamp base. The pedestal has a pedestal housing to receive the clamp base and an interior integral seat plate which can be clamped by the clamp base. The stand device can be positioned by means of either one of the clamp base and the pedestal.

4 Claims, 8 Drawing Sheets

CLAMP-BASED STAND AND A PEDESTAL FOR HOLDING THE SAME

BACKGROUND OF THE INVENTION

1. Field of the Invention

This invention relates to a stand device having a clamp base, for use in clamp lamps, fans or the like, and particularly to one incorporating a pedestal for holding the clamp base thereof.

2. Description of the Related Art

A clamp lamp typically has a clamp member at the bottom thereof to clamp the edge of a desk or the rim of a plate so as that it can be fixed to the latter. Generally, the clamp member has a pair of jaws which are formed on a pair of pivoted levers. Since the levers should have a sufficient length so as to provide an efficient clamping force, the application of clamp lamps is limited to desks or other supports having edges with sufficient projecting length for clamping. Clamp lamps can not be mounted on a desk or support which has no projecting edge or whose edges are relatively short.

SUMMARY OF THE INVENTION

Therefore, the objective of the present invention is to provide a clamp-based stand device with a pedestal so that the stand device can be positioned on a desk or the like either by the pedestal or the clamp base thereof.

According one aspect of the invention, a stand device comprises:

- a holding post having a lower end;
- a clamp base connected to said lower end for mounting the holding post; and
- a pedestal for mounting the holding post, the pedestal having a pedestal housing for receiving the clamp base and a seat plate coupled integrally with the pedestal housing to be clamped by the clamp base.

According to another aspect of the invention, a pedestal for holding a clamp base of a stand device, comprises a pedestal housing for receiving the clamp base, and a seat plate integrally coupled with the pedestal housing to be clamped by the clamp base.

BRIEF DESCRIPTION OF THE DRAWINGS

Other features and advantages of the present invention will become apparent in the following detailed description of preferred embodiments of the invention, with reference to the accompanying drawings, in which.

2

DETAILED DESCRIPTION OF THE PREFERRED EMBODIMENTS

Referring to FIGS. 1 to 6, the first preferred embodiment according to the present invention is shown to include a light unit 15, a light unit holder 16 which has an upper end connected to the light unit 15 and a lower end connected to a clamp base 11 for clamping an edge of a support, such as a table, and a pedestal 2 which is capable of standing on the support and which has means for receiving and holding the clamp base 11.

Figure 1:
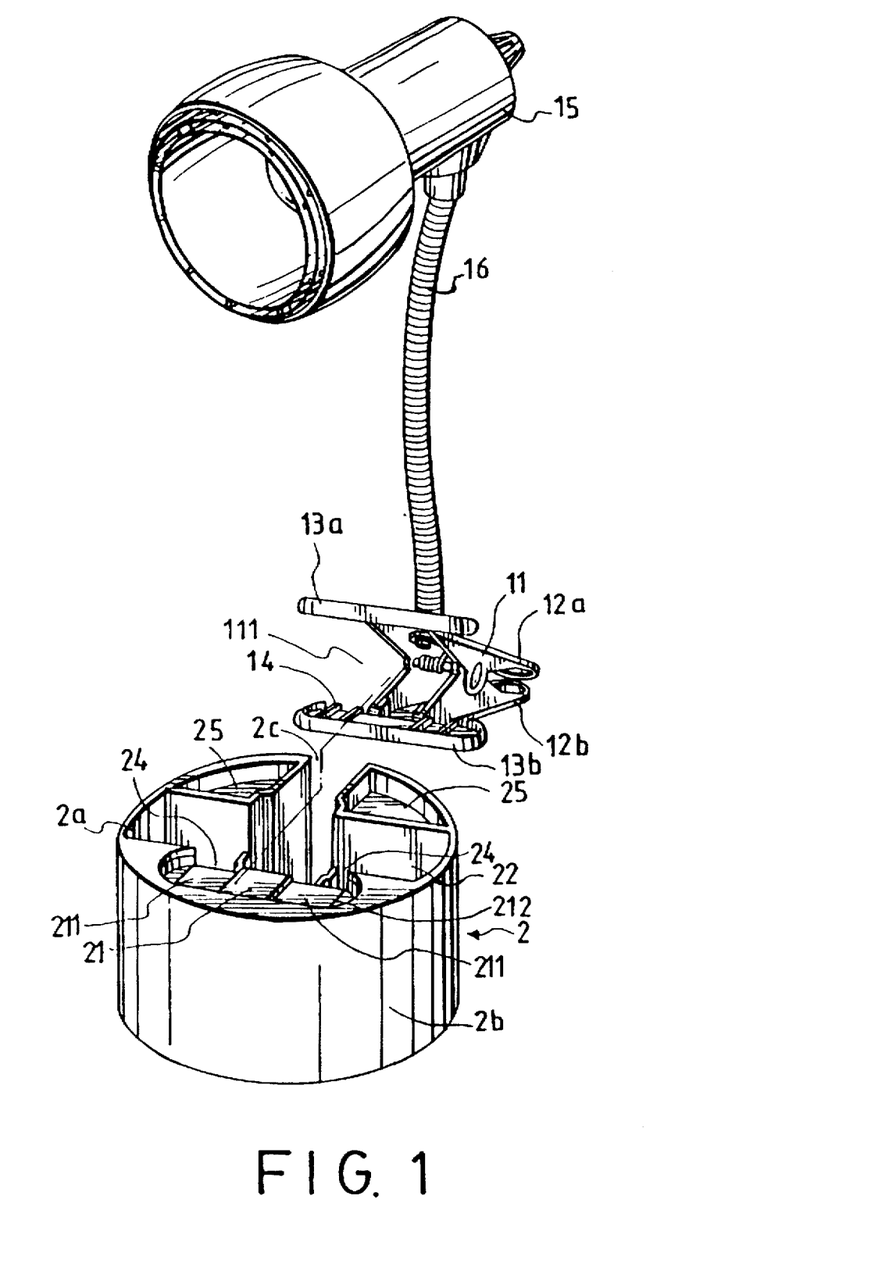
FIG. 1 is a perspective view of a first preferred embodiment of the present invention with the pedestal thereof being separated from the clamp base.

The clamp base 11 has an upper jaw member which has an upper lever portion 12a formed with a transversely extending upper jaw portion 13a, and a lower jaw member which has a lower lever portion 12b that is pivoted to the upper lever portion 12a and that is formed with a transversely extending lower jaw portion 13b. As shown in FIG. 1, when the upper and lower lever portions 12a, 12b are pressed together, the upper and lower jaw portions 13a, 13b are opened and form an opening 111. The upper and lower jaw portions 13a, 13b are formed with pads 14 which can provide an increased clamping force.

Figure 3:
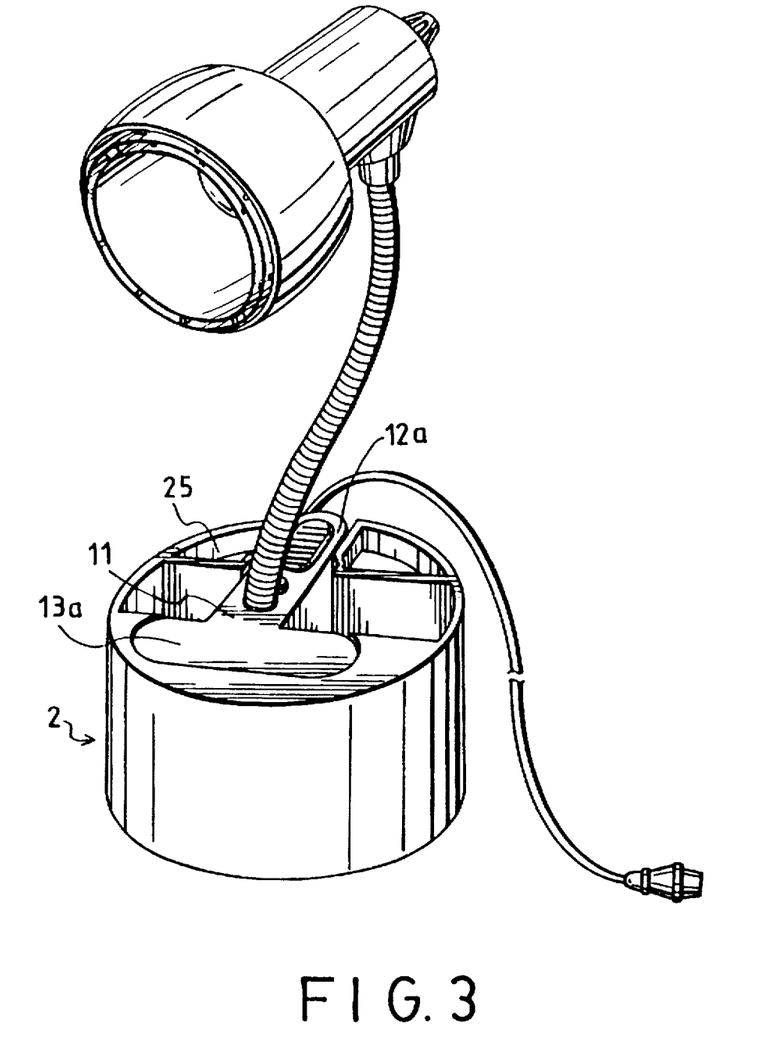
FIG. 3 is a perspective view of the first preferred embodiment in which the clamp base is placed in the pedestal.
Figure 5:
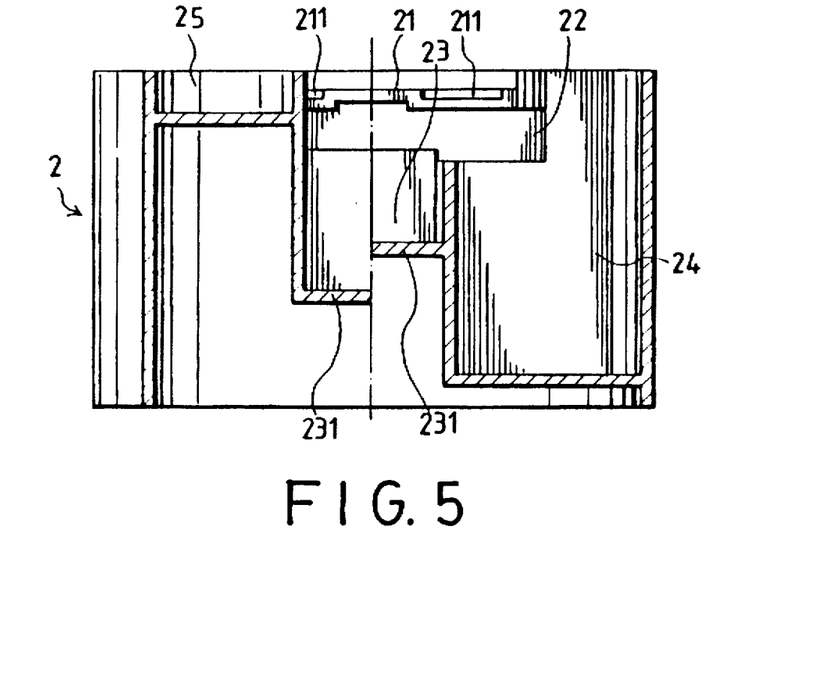
FIG. 5 is a sectional view taken along line I—I in FIG. 4.

The pedestal 2 is a hollow cylinder and has a top end 2a, a front end 2b and a rear end 2c. The pedestal 2 includes a seat plate 21 which is formed below the top end 2a near the front end 2b, a first receiving space 212 which is formed above the seat plate 21 and which is open at the top end 2a for receiving the upper jaw portion 13a, and a second receiving space 213 which is formed below the seat plate 21 for receiving the lower jaw portion 13b. The depth of the seat plate 21 from the top end 2a is substantially similar to the thickness of the upper jaw portion 13a. The upper and lower ends of the seat plate 21 are formed with slots 211 to receive the pads 14. A downwardly inclining wall 231 extends from the front end 2b below the second receiving space 213 to the rear end 2c of the pedestal 2. A third receiving space 23 is confined by the inclining wall 231 and a pair of opposing walls 232, 233. The third receiving space 23 is open at the top end 2a and the rear end 2c of the pedestal 2 for receiving the upper and lower lever portions 12a, 12b. The rear open end 234 is provided for easy access to the third receiving space 23. When the lower lever portion 12b is placed on the inclining wall 231, the upper lever portion 12a is parallel with the top end 2a (as shown in FIGS. 3 and 5). A fourth receiving space 22 is formed rearwardly of the seat plate 21 above the inclining wall 231 and intersects the third receiving space 23.

Figure 2:
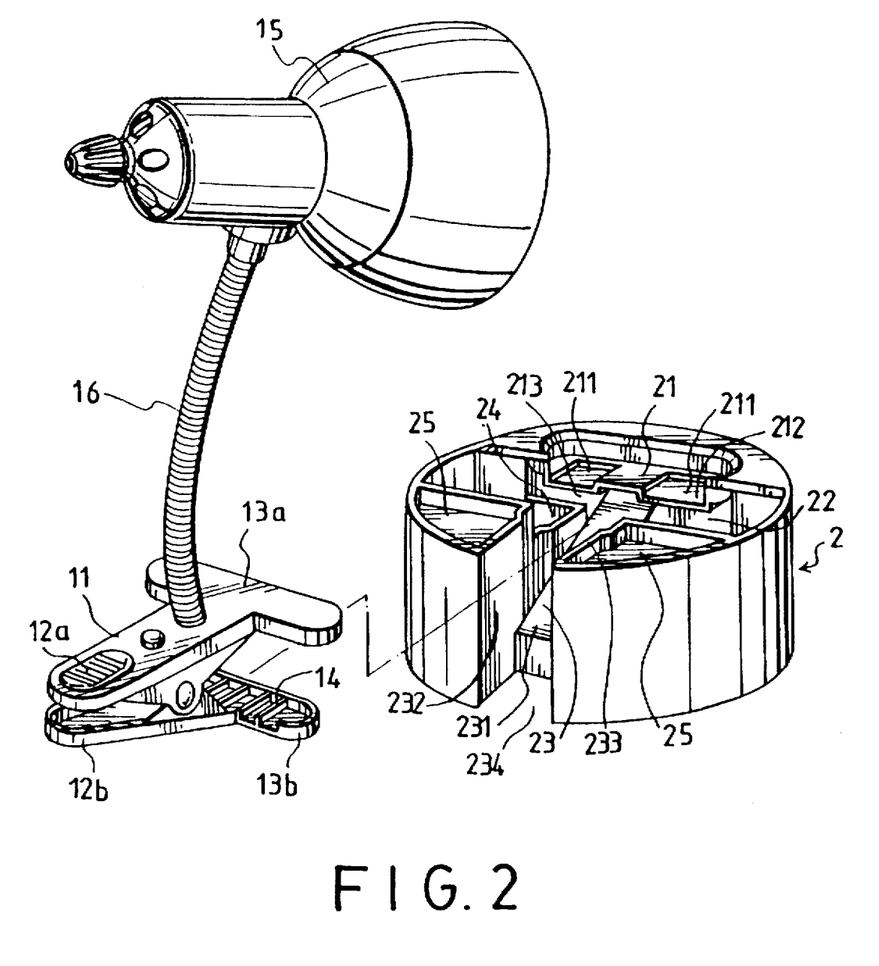
FIG. 2 is a perspective view similar to FIG. 1 but viewed from a different direction.
Figure 6:
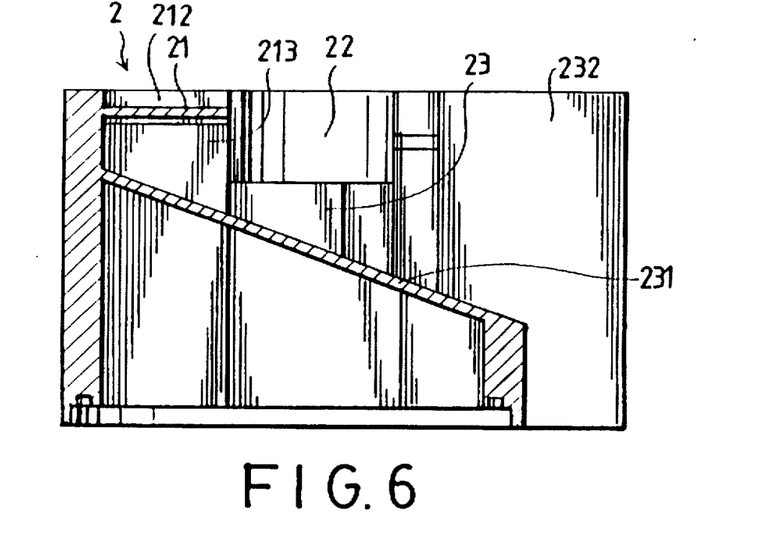
FIG. 6 is a sectional view taken along line II—II in FIG. 4.

As shown in FIGS. 1, 2 and 6, the upper and lower jaw portions 13a, 13b are opened by pressing the upper and lower lever portions 12a, 12b. The lower jaw portion 13b is first inserted into the fourth receiving space 22 and is then caused to pass through the fourth receiving space 22 to enter into the second receiving space 213 by turning downwardly the lever portions 12a, 12b toward the third receiving space 23. Then, the lever portions 12a, 12b are released so that the upper jaw portion 13a is received in the first receiving space 212 and the seat plate 21 is clamped by the upper and lower jaw portions 13a, 13b. Meanwhile, the pads 14 engage the slots 211. When the jaw portions 13a, 13b clamp the seat plate 21, the lever portions 12a, 12b are received in the third receiving space 23. The lower lever portion 12b is placed on the inclining wall 231 and the upper lever portion 12a is parallel with the top end 2a (as shown in FIG. 3). Thus, the clamp member 11 can be firmly held in the pedestal 2.

Figure 4:
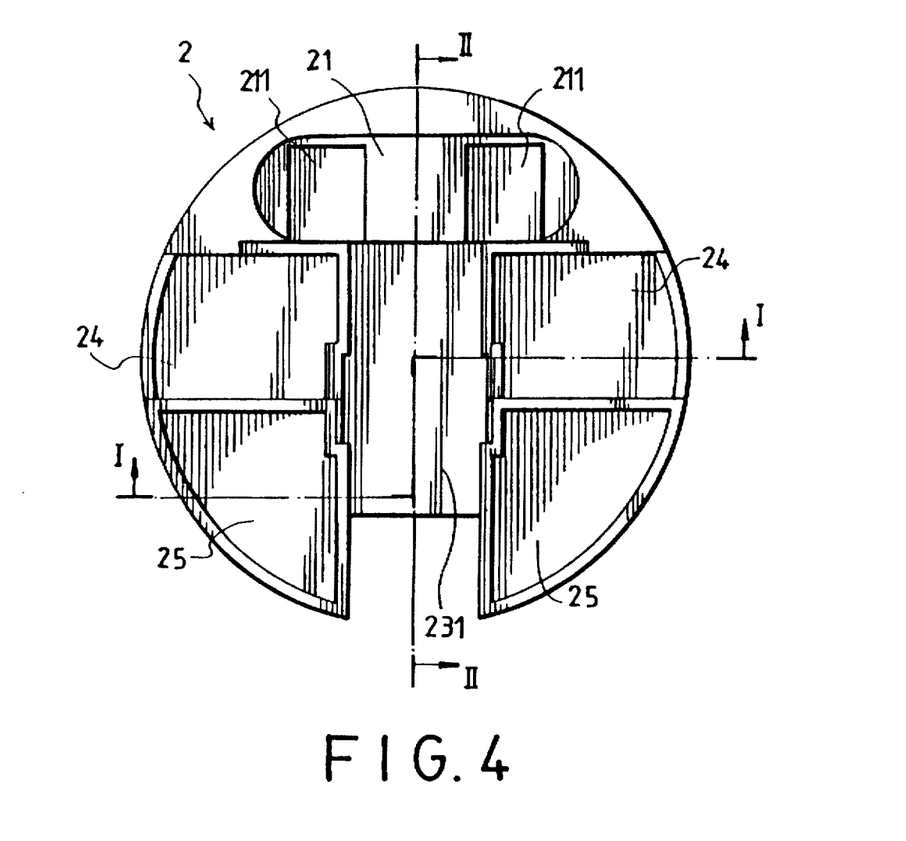
FIG. 4 is a top plan view of the pedestal of FIG. 1.

As best shown in FIGS. 1, 4 and 5, a pair of deep cavities 24 and a pair of shallower grooves 25 are formed on two sides of the third receiving space 23 respectively and are open at their top ends. These cavities and grooves 24, 25 serve to hold stationery items such as pens, rules, scissors and paper clips.

Figure 7:
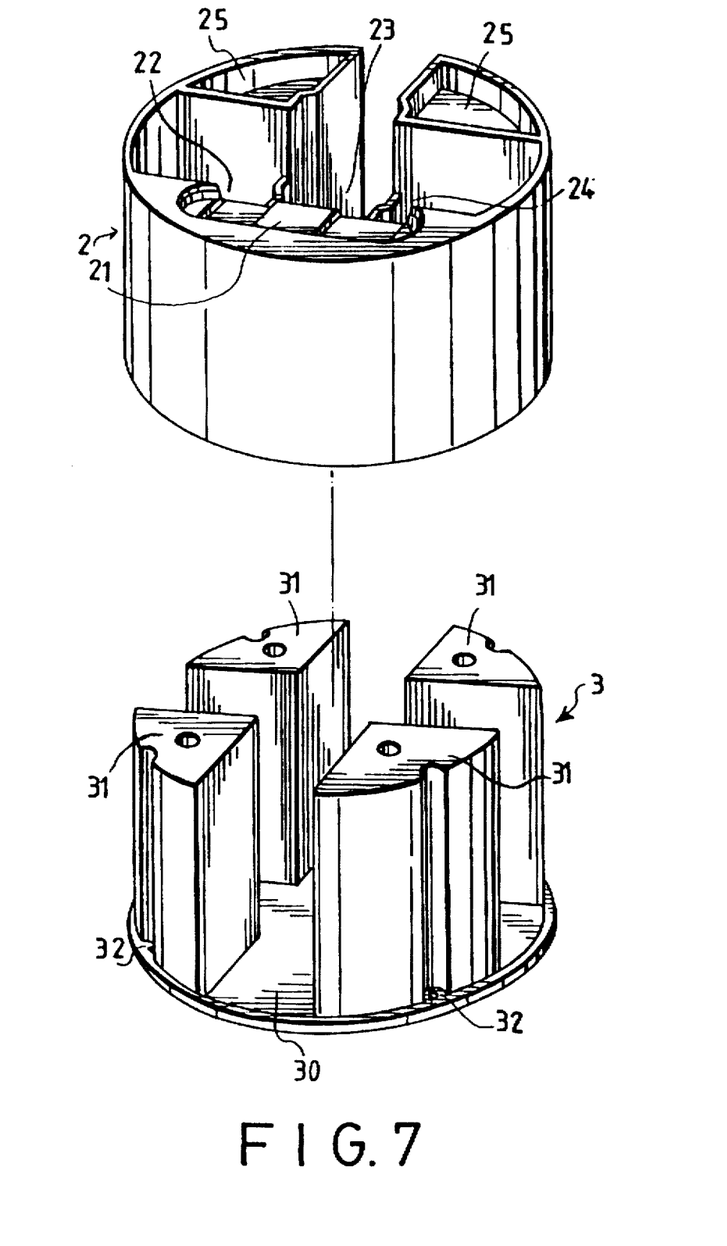
FIG. 7 is an exploded view of a second preferred embodiment pf the pedestal of the invention.
Figure 8:
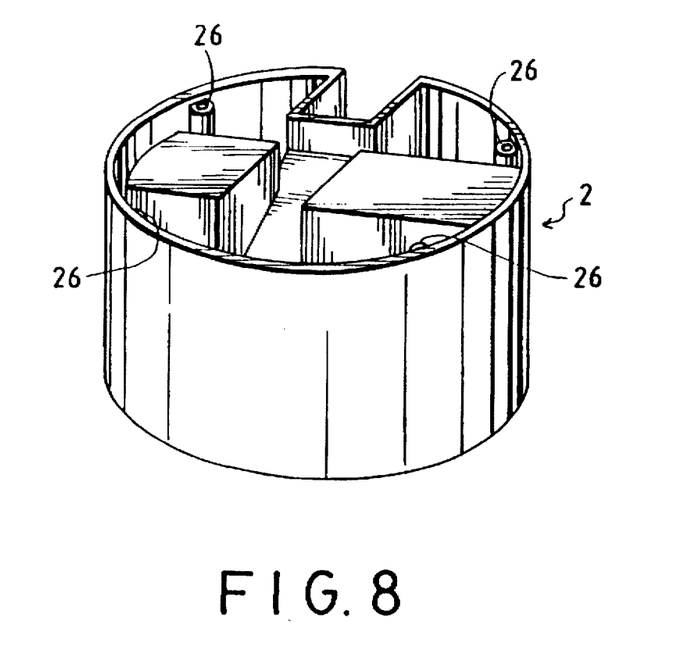
FIG. 8 is a perspective view of the pedestal of FIG. 7 in its reversed position.

Referring to FIG. 7 and 8, a second preferred embodiment of the invention further includes a reinforcing member 3 for the pedestal 2 in addition to the components of the first embodiment as described hereinabove. The reinforcing member 3 has a flat bottom 30 and four upwardly projecting portions 31 which project from the bottom 30 and which are to be inserted into the pedestal 2 via the bottom end of the pedestal 2. Through-holes 32 are formed in the reinforcing member 3 to be aligned with threaded holes 26 of the pedestal 2 to load fastening bolts (not shown). The projecting portions 31 are provided with weighting blocks (not shown) to stabilize the pedestal 2. Although weight is added to the pedestal 2 by means of the reinforce member 3 in this embodiment, the invention should not be limited thereto. Weight can be added to the pedestal 2 by being directly secured to the pedestal 2.

Figure 9:
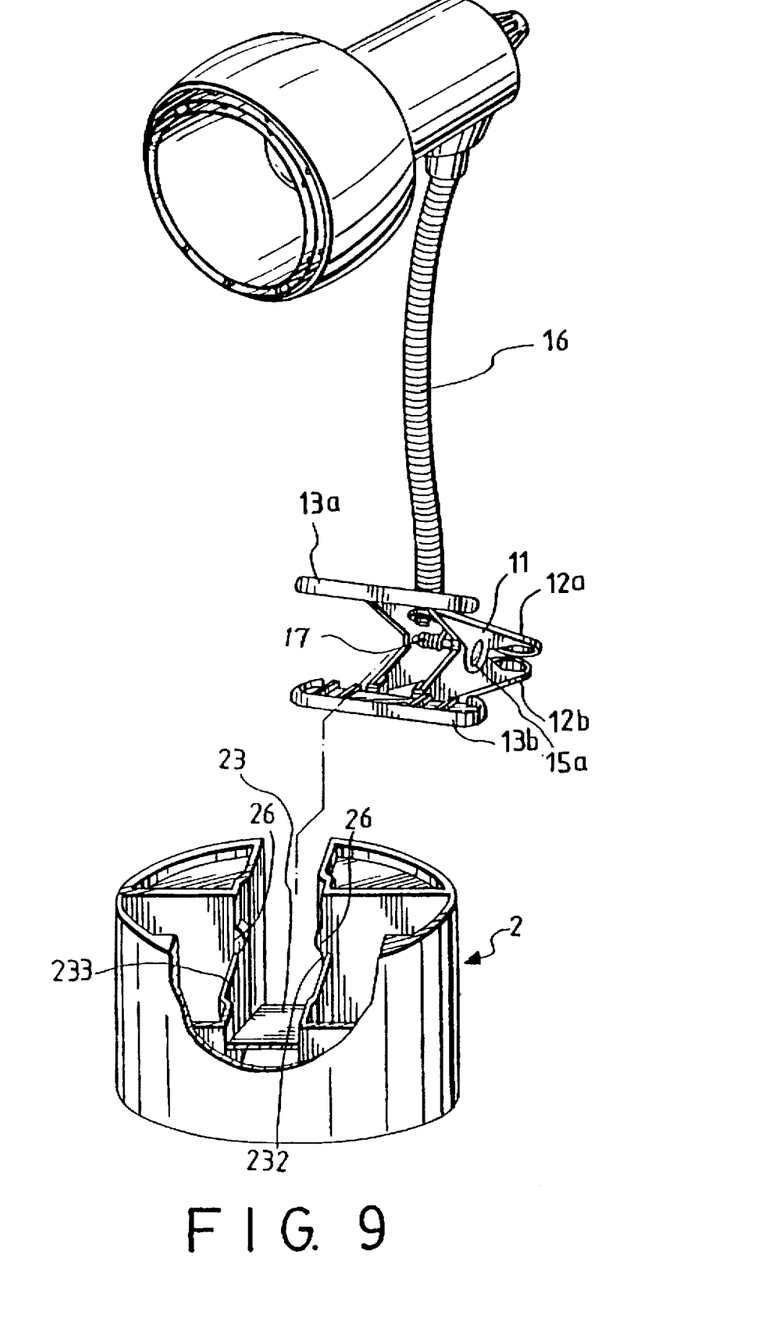
FIG. 9 is a perspective view of a third preferred embodiment of a clamp lamp with the pedestal thereof being separated from the clamp base.

A third embodiment of the present invention is shown in FIG. 9. The upper lever 12a is pivoted to the lower lever 12b by a pin 17 with head portions 15a which project outwardly of the two sides of the clamp member 11. The opposing walls 232, 233 are formed with projecting portions 26 respectively near the top end 2a of the pedestal 2 for engaging the head portions 15a so as to prevent the upper and lower lever portions 12a, 12b from being released from the third receiving space 23.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A stand device comprising:

(a) a holding post having a lower end;

(b) a clamp base connected to said lower end for mounting said holding post, wherein said clamp base including an upper jaw member and a lower jaw member, said upper jaw member having an upper lever portion formed with an upper jaw portion, said lower jaw member having a lower lever portion which is pivoted to said upper lever portion and which is formed with a lower jaw portion; and (c) a pedestal for mounting the holding post, said pedestal having a pedestal housing for receiving said clamp base and a seat plate coupled integrally with said pedestal housing to be clamped by said clamp base, said pedestal housing comprises:

(i) a top end, a front end and a rear end;

(ii) a first receiving space near said front end below said top end for receiving said upper jaw portion;

(iii) a second receiving space under said first receiving space for receiving said lower jaw portion, said seat plate being provided between said first receiving space and said second receiving space and to be clamped by said clamp base; and (iv) a third receiving space for receiving said upper and lower lever portions, said third receiving space being communicated with said first and second receiving spaces and extending to said rear end, said first and third receiving spaces being open at said top end.

2. The stand device as claimed in claim 1, wherein said pedestal housing further comprises a downwardly inclining wall extending from said front end below said second receiving space towards said rear end, and opposing walls extending on two sides of said inclining wall posteriorly of said seat plate, said inclining wall and said opposing walls confining said third receiving space, said lower lever portion lying on said inclining wall, said upper lever portion being parallel with said top end.

3. The stand device as claimed in claim 2, wherein said pedestal housing further comprises a fourth receiving space formed posteriorly of said first receiving space, said fourth receiving space being transverse to and intersecting said third receiving space and being communicated with said second receiving space, said lower jaw portion entering into said second receiving space by passing through said fourth receiving space.

4. The stand device as claimed in claim 1, wherein said pedestal housing further has means for preventing said clamp base from being released from said third receiving space.

* * * * *